United States Patent
Vivanco et al.

(10) Patent No.: US 11,652,538 B2
(45) Date of Patent: May 16, 2023

(54) REDUCING UPLINK INTERFERENCE INDUCED BY AERIAL USER EQUIPMENT

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Stawiarski, Carpentersville, IL (US)

(73) Assignees: AT&T TECHNICAL SERVICES COMPANY, INC., Vienna, VA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 220 days.

(21) Appl. No.: 17/219,036

(22) Filed: Mar. 31, 2021

(65) Prior Publication Data
US 2022/0321204 A1 Oct. 6, 2022

(51) Int. Cl.
*H04B 7/185* (2006.01)
*H04W 72/04* (2009.01)

(52) U.S. Cl.
CPC ........ *H04B 7/18506* (2013.01); *H04W 72/04* (2013.01)

(58) Field of Classification Search
CPC ............... H04B 7/18506; H04B 7/185; H04B 7/18502; H04B 17/345; H04B 17/336; H04B 7/18571; H04B 7/18517; H04B 1/0475; H04B 7/18591; H04B 17/318; H04B 7/15507; H04W 72/04;
(Continued)

(56) References Cited

U.S. PATENT DOCUMENTS 10,348,386 B1 * 7/2019 Nammi .................. H04B 7/043
10,848,234 B2 * 11/2020 Axmon .............. H04B 1/71075
(Continued)

OTHER PUBLICATIONS

"Motivation for Study on Enhanced LTE Support for Aerial Vehicles," NTT DOCOMO INC, Ericsson, 3GPP TSG RAN #75, Dubrovnik, Croatia, Mar. 6-9, 2017, AI 10.1.2, RP-170157, 8 pages.
(Continued)

*Primary Examiner* — Lana N Le
(74) *Attorney, Agent, or Firm* — Amin, Turocy & Watson, LLP

(57) ABSTRACT

An architecture to reduce or eliminate uplink interference induced by aerial user equipment (UE) when aerial UE is introduced into groups of terrestrial based UE operating in terrestrial fourth generation (4G) long term evolution (LTE), fifth generation (5G) networks. A method can comprise determining a number of terrestrial based user equipment impacted by uplink interference caused by uplink transmissions associated with aerial user equipment, wherein the aerial user equipment and the terrestrial based user equipment are controlled by serving cell equipment; determining an enclosed area that bounds the number of terrestrial based user equipment; and initiating a carrier aggregation process on the aerial user equipment, wherein the carrier aggregation divides the uplink transmissions associated with the aerial user equipment over a group of serving cell equipment included in the enclosed area.

20 Claims, 15 Drawing Sheets

(58) Field of Classification Search
CPC . H04W 72/0453; H04W 88/04; H04W 16/18; H04W 72/0413; H04W 36/0055; H04W 72/082; H04W 52/0209; H04W 72/121; H04W 28/0236; H04W 40/12; H04W 84/06; H04W 88/06
See application file for complete search history.

(56) References Cited

U.S. PATENT DOCUMENTS

| | | | |
|---|---|---|---|
| 2004/0253951 A1* | 12/2004 | Chang | H04W 84/005 455/430 |
| 2008/0102812 A1* | 5/2008 | Chari | H01Q 9/32 455/424 |
| 2008/0274734 A1* | 11/2008 | Kostanic | H04B 7/18508 455/431 |
| 2015/0163848 A1* | 6/2015 | Lin | H04W 88/04 370/329 |
| 2017/0272131 A1* | 9/2017 | Ananth | H04W 72/082 |
| 2018/0041267 A1* | 2/2018 | Miranda | H04W 28/16 |
| 2020/0260404 A1* | 8/2020 | Vrind | H04B 7/18504 |
| 2021/0044995 A1* | 2/2021 | Cirkic | H04B 7/0626 |

OTHER PUBLICATIONS

"New SID on Enhanced Support for Aerial Vehicles," NTT DOCOMO INC, Ericsson, 3GPP TSG RAN Meeting #75, Dubrovnik, Croatia, Mar. 6-9, RP-170742, 5 pages.

"New SID on Enhanced Support for Aerial Vehicles," NTT DOCOMO INC, Ericsson, 3GPP TSG RAN Meeting #75, Dubrovnik, Croatia, Mar. 6-9, RP-170779, 4 pages.

\* cited by examiner

REDUCING UPLINK INTERFERENCE INDUCED BY AERIAL USER EQUIPMENT

TECHNICAL FIELD

The disclosed subject matter provides systems and methods to reduce or eliminate uplink interference induced by aerial user equipment (UE) when aerial UE is introduced into groups of terrestrial based UE operating in terrestrial fourth generation (4G) long term evolution (LTE), fifth generation (5G) networks and/or other next generation networks.

BACKGROUND

Aerial UE can generate large amounts of uplink (UL) interference into terrestrial based UE that are being serviced by groups of serving cell equipment. Aerial UE generally are airborne, and as such, can have better, or direct, line of sight (LOS) to terrestrial based UE. Accordingly, aerial UE can use higher transmission power levels than terrestrial based UE. Aerial UE can generate UL interference not only to terrestrial based UE connected to the same serving cell equipment (e.g., the serving cell equipment providing service for the aerial UE), but can also generate UL interference to other terrestrial based UE attached to one or more neighboring serving cell equipment operating in a same frequency band. Further, as a function of aerial UE being at height over terrain and having better LOS to various serving cell equipment, aerial UE, in some instances, can be served by distant/remote serving cell equipment, rather than closer and more proximate serving cell equipment. Thus, several neighboring serving cell equipment can be impacted. Aerial UE can use heavy UL data (e.g., uploading video/pictures constantly), compared with terrestrial based UE. Currently UE (terrestrial based and/or aerial based) determine appropriate serving cell equipment for initial attachment and/or handover based on reference signal to received power (RSRP) metrics. UL interference generally is not taken into account when determining serving cell equipment to which UE should facilitate attachment and/or effectuate handover.

DETAILED DESCRIPTION

Figure 1:
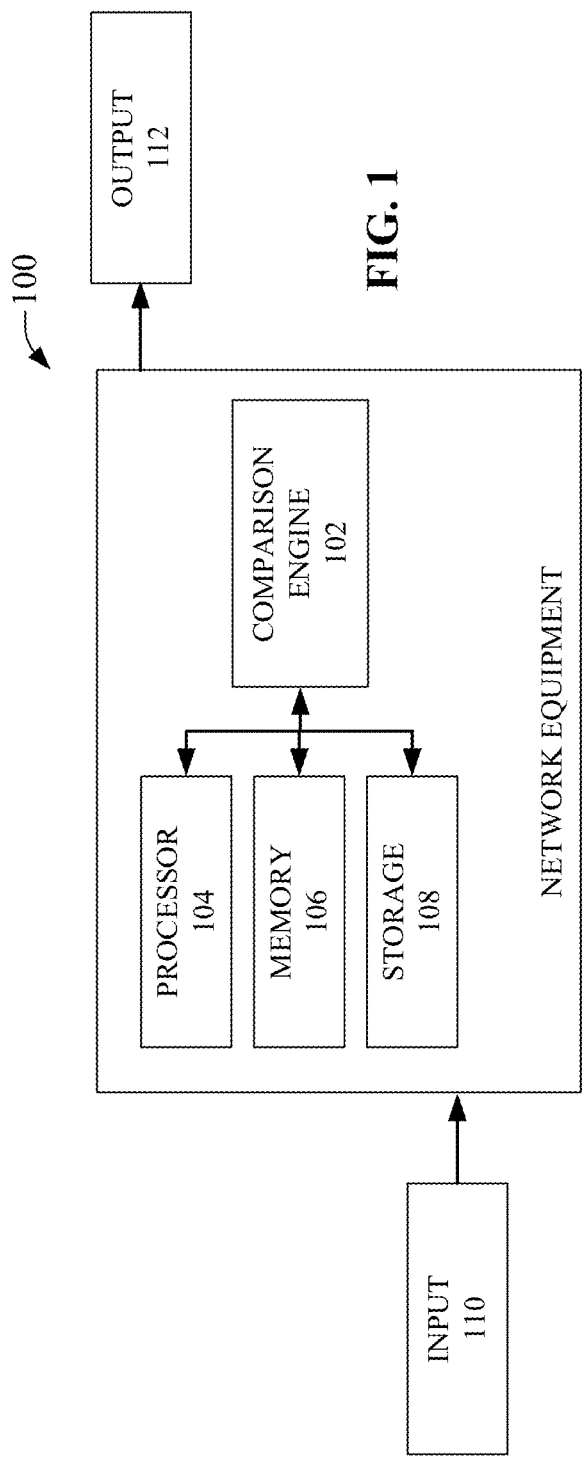
FIG. 1 is an illustration of a system that reduces or eliminates uplink interference induced by aerial user equipment (UE) when aerial UE is introduced into groups of terrestrial based UE operating in terrestrial fourth generation (4G) long term evolution (LTE), fifth generation (5G) networks and/or other next generation networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, equipment, or device comprising: a processor, and a memory that stores executable instructions that, when executed by the processor, facilitate performance of operations. The operations can comprise: determining a number of terrestrial based user equipment impacted by uplink interference caused by an entry of aerial user equipment into a collection of terrestrial based user equipment controlled by serving cell equipment, determining a boundary area that encompasses the number of terrestrial based user equipment, and initiating carrier aggregation on the aerial user equipment, wherein the carrier aggregation splits uplink traffic transmitted by the aerial user equipment over a group of serving cell equipment included in the boundary area.

Additional operations can comprise determining the number of terrestrial based user equipment based on uplink interference data received prior to the entry of the aerial user equipment into the collection of terrestrial based user equipment, determining the number of terrestrial based user equipment based on uplink interference data received after to the entry of the aerial user equipment into the collection of terrestrial based user equipment, and receiving capability data representing the aerial user equipment.

Further operations can include determining a number of groupings of component carriers associated with the carrier aggregation to be assigned to serving cell equipment included in the group of serving cell equipment included in the boundary area, and determining the number of grouping of component carriers to be assigned to the serving cell equipment included in the group of serving cell equipment based on ensuring a reduction in the uplink interference caused by the entry of aerial user equipment into a collection of terrestrial based user equipment.

In accordance with further embodiments, the subject disclosure describes a method and/or process, comprising a series of acts that, for example, can include: determining, by equipment comprising a processor, a number of terrestrial based user equipment impacted by uplink interference caused by uplink transmissions associated with aerial user equipment, wherein the aerial user equipment and the terrestrial based user equipment are controlled by serving cell equipment, determining, by the equipment, an enclosed area that bounds the number of terrestrial based user equipment, and initiating, by the equipment, a carrier aggregation process on the aerial user equipment, wherein the carrier aggregation divides the uplink transmissions associated with the aerial user equipment over a group of serving cell equipment included in the enclosed area.

Other acts can include determining, by the equipment, the number of terrestrial based user equipment based on uplink interference data received prior to attachment of the aerial user equipment to the serving cell equipment, determining, by the equipment, the number of terrestrial based user equipment based on uplink interference data received after to attachment of the aerial user equipment to the serving cell equipment, and receiving, by the equipment, capability data representing the aerial user equipment.

Additional acts can include determining, by the equipment, the uplink interference as a function of a key performance indicator value, wherein the key performance indicator value represents a received signal strength over noise power ratio value that the terrestrial based user equipment uses to effectuate an uplink transmission.

In accordance with still further embodiments, the subject disclosure describes a machine readable medium, a computer readable storage device, or non-transitory machine readable media comprising instructions that, in response to execution, cause a computing system (e.g., equipment, devices, groupings of devices, etc.) comprising at least one processor to perform operations. The operations can include: determining a number of terrestrial based user equipment impacted by uplink interference caused by uplink transmissions associated with aerial user equipment, wherein the aerial user equipment and the terrestrial based user equipment are controlled by serving cell equipment, determining an enclosed area that bounds the number of terrestrial based user equipment, and initiating a carrier aggregation process on the aerial user equipment, wherein the carrier aggregation divides the uplink transmissions associated with the aerial user equipment over a group of serving cell equipment included in the enclosed area.

Other operations can comprise determining the uplink interference as a function of a key performance indicator value exceeding a threshold value, wherein the key performance indicator value represents a received signal strength over noise power ratio value that the terrestrial based user equipment uses to effectuate an uplink transmission.

The subject disclosure in various embodiments describes systems and methods to reduce UL interference induced by aerial UE when aerial UE is introduced into collections of terrestrial based UE being served by serving cell equipment (e.g., base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like). The disclosed systems and/or methods can be operational at central node global control equipment located the core network. Examples of central node global control equipment can be mobile edge computing (MEC) equipment, self organized network (SON) equipment, and/or radio access network intelligent controller (RIC) equipment. The described systems and/or methods, in some embodiments, can collect UE information data and/or UE device type data. The systems and/or methods, in various embodiments, can detect when, where, and whether an aerial UE is attached to and/or is in operative communication with the core network (or identifiable segments of the core network). The systems and/or methods can then compare UL interference of terrestrial based UE attached to various neighboring serving cell equipment before attachment of the aerial UE to the core network, and after the aerial UE attached to the core network. In instances where, and based at least on the comparison, it is determined that aerial UE is inducing large amounts of UL interference to terrestrial based UE, one or more traffic management actions can be facilitated and/or effectuated. For example, in accordance with some embodiments, aerial UE can be directed to effectuate infra-frequency carrier aggregation (CA); in other additional and/or alternative embodiments, aerial UE can be informed that it should actuate inter-frequency CA. In other embodiments, aerial UE can be directed to effectuate handover from first serving cell equipment to second serving cell equipment; in additional and/or alternative embodiments, aerial UE can be directed to transfer from using first frequency bands to use a second frequency bands in order to alleviate or mitigate the impact to terrestrial based UE of UL interference caused by aerial UE.

The described systems and/or methods can reduce overall UL interference induced by the entry of aerial UE into grouping of terrestrial based UE being serviced by collections of serving cell equipment. Significant UL interference introduced into groupings of terrestrial based UE managed and controlled by serving cell equipment can force the terrestrial based UE to unnecessarily increase their UL transmission power in order to overcome the noise being cause by the aerial UE which can result in the drainage of battery power associated with the terrestrial based UE. Additionally, when aerial UE enters a grouping of terrestrial based UE being serviced by serving cell equipment, a higher number of UL retransmissions can take place which can result in significant transmission delays and unwarranted transmission latency.

Many use cases of unmanned aerial vehicles (UAVs), such as drones, require beyond visual LOS communications. Mobile networks can offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are being envisioned and are emerging. These envisioned and prospective applications can be a potential boon for mobile network operator entities. Use cases of commercial UAVs are growing rapidly, including delivery, communications and media, inspection of critical infrastructure, surveillance, search-and-rescue operations, agriculture, and similar worthy endeavors.

Research and development of current mobile broadband communication (e.g., LTE) has been primarily devoted to terrestrial based communication. Providing tether-less broadband connectivity for UAVs is an emerging field.

Figure 12:
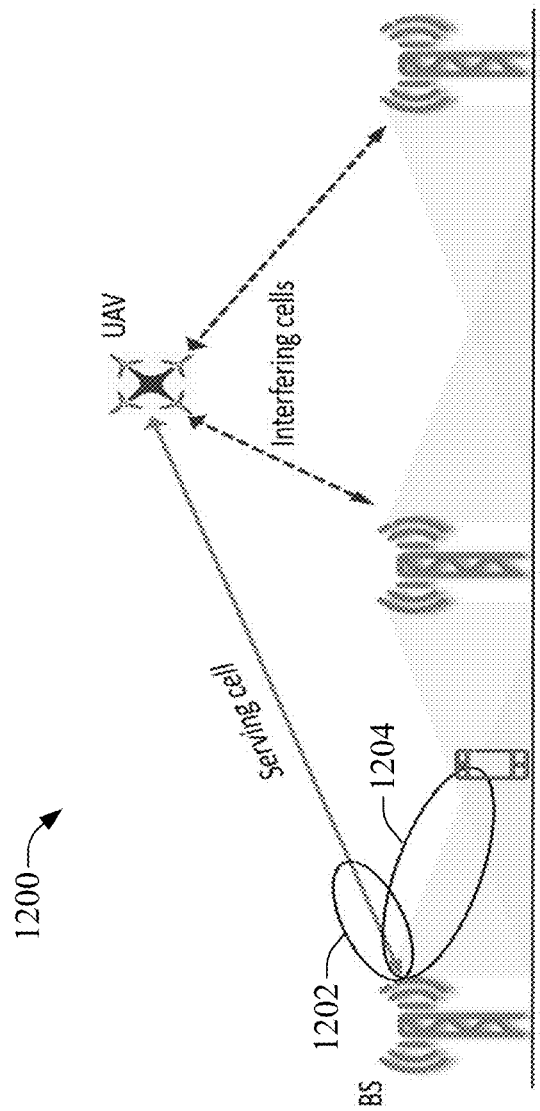
FIG. 12 provides illustration of how network equipment antenna direction affects aerial user equipment, in accordance with aspects of the subject disclosure.

One main aspect that makes using LTE and/or 5G to serve UAVs challenging is the fact that mobile LTE and 5G networks are generally optimized for terrestrial broadband communication. Thus, the antennas associated with terrestrial based serving equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other serving cell equipment. With down tilted antennas, small UAVs may thus only be served by transmission or broadcast side lobes of the antennas associated with terrestrial based serving cell equipment. FIG. 12 illustrates the broadcast disparity between the down-tilted antennas 1202 and side lobes 1204.

Due to the presence of possible voids or nulls in the transmission side lobes 1204, and due to close-to-free-space propagation in the sky, aerial UAVs or aerial UEs can detect several ground-based serving cell equipment within a defined geographical area. In addition, aerial UE, since they typically are positioned above terrestrial based radio equipment and above radio signal echo (e.g., radio clutter) emanating from serving cell equipment, can detect stronger signals from distant serving cell equipment (e.g., interfering cells) than terrestrial based UE that are more geographically proximate. Thus, aerial UE can be served by much more distant serving cell equipment (e.g., interfering cells) instead of the most proximate serving cell equipment.

Figure 13:
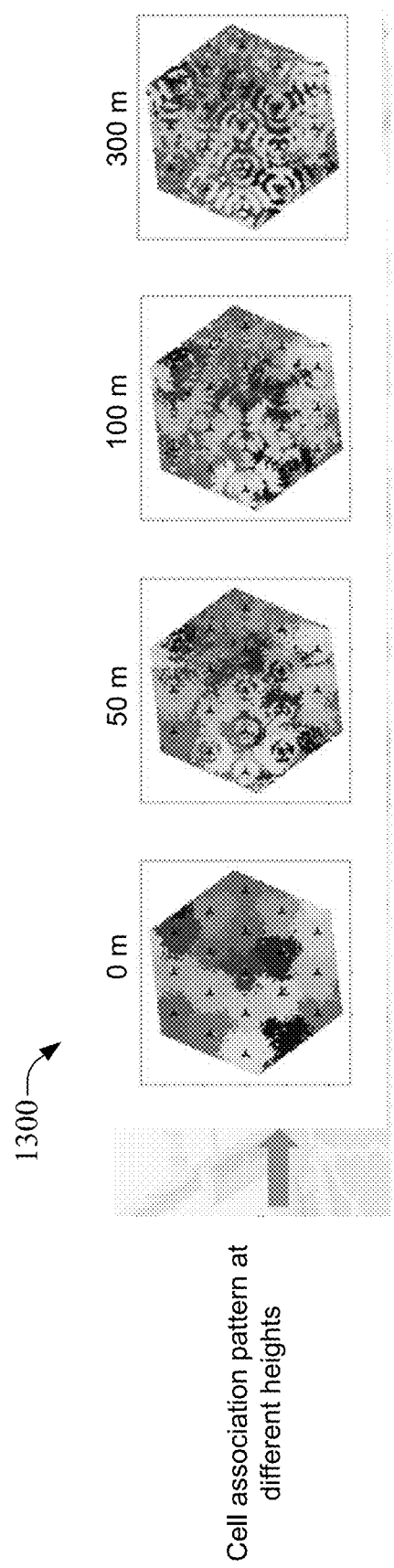
FIG. 13 provides depiction of network equipment association patterns at different altitudes, in accordance with aspects of the subject disclosure.

FIG. 13 provides depiction of the relative disparities in coverage areas between terrestrial coverage areas and aerial coverage areas. In FIG. 13 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50 m, 100 m, 300 m) above terrain the coverage areas associated with respective network equipment become less and less well defined and more and more amorphous.

When aerial UE are introduced into a collection of terrestrial based UE being serviced by serving cell equipment, aerial UE can generate large amounts of UL interference. Aerial UE generally are airborne (e.g., at height over terrain), and as such can have direct LOS to terrestrial UE. Current technical standards promulgated by the 3rd Generation Partnership Project (3GPP) defines three UL transmission power classes: (1) power class 1 that allows power levels up to 31 decibel-milliwatts (dBm); (2) power class 2 that allows power levels up to 26 dBm; and (3) power class 3: that allows power levels up to 23 dBm. Typically, power class 3 are selected for regular terrestrial based UE, while power classes 1 and 2 are selected for use by public safety terrestrial based UE (e.g., UE used by emergency users, . . . ). Aerial UE that use power classes 1 or 2 can generate more interference to terrestrial based UE as they can use higher transmission power.

Aerial UE can generate UL interference not only to terrestrial based UE connected to the same serving cell equipment, but also can generate UL interference to other terrestrial based UE attached to neighboring serving cell equipment operating in the same frequency band. In addition, aerial UE can be serviced by distant serving cell equipment (e.g., neither proximate to the serving cell equipment nor its immediate neighboring serving cell equipment). Thus, several neighboring serving cell equipment can be impacted. Aerial UE can use heavy UL data (e.g., uploading video/pictures constantly) in contrast to terrestrial based UE.

The selection and determination of serving cell equipment by UE is generally based on reference signal to received power (RSRP) metrics. UL interference however is typically not a factor taken into consideration when determining the serving cell equipment to which to attach and/or the serving cell equipment to provide services to UE. Generally, aerial UE can select serving cell equipment with the strongest RSRP (e.g., first serving cell equipment). Nevertheless, other terrestrial UE associated with neighboring serving cell equipment (e.g., second serving cell equipment, third serving cell equipment, fourth serving cell equipment, fifth serving cell equipment, . . . ) can also operate in the same frequency band as aerial UE associated with the first serving cell equipment. Therefore, terrestrial UE attached to neighboring serving cell equipment (e.g., second serving cell equipment, third serving cell equipment, fourth serving cell equipment, fifth serving cell equipment, . . . ) can be impacted from aerial UE transmission interference emanating from aerial UE attached to first serving cell equipment.

With reference to the Figures, FIG. 1 illustrates a system 100 (e.g., network equipment) that reduces or eliminate uplink interference induced by aerial UE when the aerial UE is introduced into a grouping of terrestrial based UE operational in terrestrial fourth generation (4G) long term evolution (LTE), fifth generation (5G) networks and/or other next generation networks. System 100 can be central node global control equipment located on the core network. Examples of central node global control equipment can be mobile edge compute (MEC) equipment, self organized network (SON) equipment, and/or radio access network intelligent controller (RIC) equipment.

As illustrated system 100 can comprise comparison engine 102 that can be communicatively coupled to processor 104, memory 106, and storage 108. Comparison engine 102 can be in communication with processor 104 for facilitating operation of computer and/or machine executable instructions and/or components by comparison engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by comparison engine 102 to produce one or more useful, concrete, and tangible result, and/or transform one or more articles to different states or things. Further, system 100 can also generate and output the useful, concrete, and tangible results, and/or the transformed one or more articles produced by comparison engine 102, as output 112.

In some embodiments, system 100 can be Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to reduce or eliminate uplink interference induced by aerial user equipment (UE) when aerial UE is introduced into groups of terrestrial based UE operating in terrestrial fourth generation (4G) long term evolution (LTE), fifth generation (5G) networks and/or other next generation networks. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Comparison engine 102 can collect, collate, and aggregate UE information data, such as key performance indicator (KPI) values that can have been returned to, or received by, network equipment by UE (terrestrial based and/or aerial) located within the coverage ambit of serving cell equipment. In some embodiments, KPI values can have been returned to, or received by, network equipment by UE (aerial and/or terrestrial based) situated within broadcast coverage areas cast by one or more immediately proximate neighboring serving cell equipment. In additional and/or alternative embodiments, KPI values can have been returned to, or received by, network equipment by UE positioned within the transmission coverage areas associated with more distant serving cell equipment (e.g., serving cell equipment that an aerial UE can have been attached to, and/or been in communication with, during its passage to the coverage umbra or penumbra afforded by a current serving cell equipment).

Comparison engine 102, in some embodiments, can order the returned KPI values based on magnitudes associated with individual and/or combinations of KPI values. In other embodiments, comparison engine 102 can rank the returned KPI values as a function of UE device type and/or combinations of KPI values associated with respective UE device type. In further embodiments, comparison engine 102 can organize the returned KPI values based on one or more KPI value exceeding (or falling below) one or more threshold values. In additional and/or alternative embodiments, comparison engine 102 can rank and/or order returned KPI values based on distances between various UE within the broadcast or transmission umbrae provided by serving cell equipment and/or neighboring serving cell equipment. In additional or alternative embodiments, comparison engine 102 can aggregate, order, and/or rank KPI values based on broadcast or transmission sectors facilitated and/or effectuated by one or more transmission antennae associated with serving cell equipment and/or neighboring serving cell equipment.

Illustrative KPI values can include values associated with RSRP measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE and serving cell equipment, distance measurement values indicating distances between UE and respective neighboring serving cell equipment, or other similarly appropriate values. As has been noted, KPI values can be values that can shave been periodically returned within measurement reports by UE extant with the control and/or coverage ambit associated with network equipment, such as serving cell equipment, neighboring serving cell equipment, or similar network equipment.

Comparison engine 102, based on KPI values, can compare UL interference that terrestrial UE attached to serving cell equipment can have been experiencing before the entrance of aerial UE, and subsequent to the arrival (attachment) of aerial UE into the transmission coverage areas managed, monitored, and/or controlled by serving cell equipment. In some embodiments, comparison engine 102 can base the comparison from the relative perspectives of the current serving cell equipment and/or the current serving cell equipment's immediately neighboring serving cell equipment (e.g., contiguous with and/or abutting the current serving cell equipment). In additional and/or alternative embodiments, comparison engine 102 can base the comparison from the relative perspectives of serving cell equipment that is at distance (e.g., not immediately bordering and/or adjacent to the current serving cell equipment, but nevertheless within distances that UL interferences to terrestrial based UE can pose a nuisance) from the current serving cell equipment.

In the context of performing the comparison regarding UL interference one or more defined or definable threshold values can be used to identify whether the UL interference caused by attached aerial UE to terrestrial based UE is too large for the attached terrestrial based UE to overcome.

Once comparison engine 102 has determined that aerial UE is inducing large amounts of UL interference to terrestrial UE, comparison engine 102 can initiate a number of traffic management actions in order to reduce the UL interference. In some embodiments, comparison engine 102 can direct aerial UE to engage in intra-frequency carrier aggregation (CA). In other embodiments, comparison engine 102 can direct aerial UE to engage in inter-frequency CA. When UE (aerial UE and/or terrestrial based UE) engage in CA UL transmission interference can be reduced. The impact of directing aerial UE to engage in CA can have a marked effect in reducing UL transmission interference to terrestrial UE being served by serving cell equipment that is also serving aerial UE.

CA is a process that can be carried out by UE to increase the data rate for a particular UE (in this case aerial UE), whereby multiple frequency blocks (e.g., component carriers (CC)) can be assigned for used by the UE. The more frequency blocks or component carriers that are assigned for use by UE the greater the possible data rate for that UE. Use of CA can in many instances also increase the sum data rate of serving cell equipment because of better resource utilization.

Other traffic management actions that can be effectuated and/or facilitated by comparison engine 102 in order to reduce uplink interference induced by aerial UE, in some embodiments, can include handing over service for some terrestrial UE to other serving cell equipment and/or handing over service for other terrestrial UE to other frequency bands. Hand over can be effectuated and/or facilitated for those terrestrial UE that are being impacted by uplink interference being induced by aerial UE.

At this juncture it should be noted that neighbor serving cell equipment are capable of measuring UL interference (e.g., UL.SNR values). An UL.SNR value is a ratio of received signal strength values over noise power values. Received signal strength values are generally the amount of power that UE use in an UL transmission. Noise values can typically depend on the amount of UL interference induced by aerial UE. UL.SNR values can be measured by serving cell equipment (e.g., comparison engine 102) at a terrestrial UE level granularity. If a particular terrestrial UE reports large UL.SNR values (e.g., exceeding, or falling below, one or more determined or determinable threshold values) this can mean that signal strength values are much stronger than noise values, which can in turn imply that UL transmissions by terrestrial UE are fast and reliable. On the other hand, if low UL.SNR values are being reported by terrestrial UE to serving cell equipment (e.g., comparison engine 102) this can imply that the noise values are high in relation to the signal strength values, which can mean that UL transmission by terrestrial UE are slow and unreliable. When UL.SNR values are low it can mean that terrestrial UE will be compelled to boost UL transmission power in order to overcome the noise being introduced by aerial UE, with the resultant draining of terrestrial UE battery power. Additionally, when received UL.SNR values are low, a high number of retransmissions by terrestrial UE can be needed to transmit data to the serving cell equipment, which can lead to unnecessary transmission latencies.

When aerial UE is engaged in CA it can attach to two or more serving cell equipment at the same time. Thus, aerial UE uplink load can be split across multiple serving cell equipment and accordingly uplink transmission interference to terrestrial UE can be reduced. However, UL interference can be expanded to a larger area depending on the location of the CCs. Intra-frequency CA can refer to aggregation of serving cell equipment that operate in a same frequency band. For example, in intra-frequency CA, first serving cell equipment, second serving cell equipment, and third serving cell equipment operated in a first frequency band. Inter-frequency CA can refer to aggregation of serving cell equipment that operate in different frequency bands. For instance, in inter-frequency CA, first serving cell equipment operate in a first frequency band, second serving cell equipment operate in a second frequency band, and third serving cell equipment operate in third frequency band. Aerial UE engaged in intra-frequency CA typically will not generate UL interference to terrestrial based UE operating in other frequency bands.

In accordance with the foregoing, comparison engine 102 can determine the amount of UL transmission power that aerial UE is using, the capabilities of the aerial UE, and the network topology within which the serving cell equipment that is hosting comparison engine 102 is situated. Based at least on these factors comparison engine 102 can determine which type of CA will mitigate UL interference caused by aerial UE to terrestrial based UE operational within the coverage ambit of the serving cell equipment.

In view of the example system(s) described above, example method(s) that can be implemented in accordance with the disclosed subject matter can be better appreciated with reference to the flowcharts and/or illustrative time sequence charts in FIGS. 2-9. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

Figure 2:
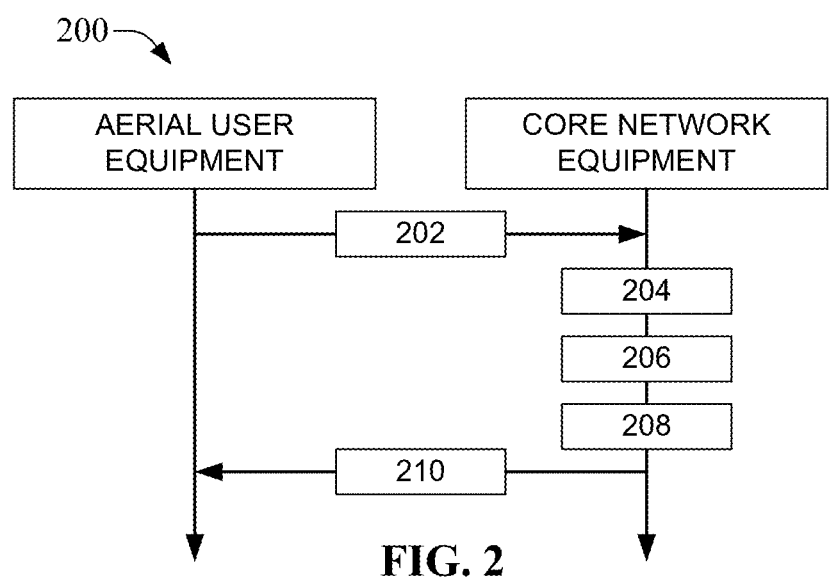
FIG. 2 provides depiction of a time sequence chart that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

FIG. 2 illustrates an example time sequence chart 200 that can be used to effectuate and/or facilitate the reduction or elimination of uplink interference induced by aerial UE when aerial UE is introduced into groupings of terrestrial based UE operational in 4G LTE, 5G networks and/or other next generation networks. Time sequence chart can commence at act 202, wherein UE can contact, via transmitted signal message data, land based core network equipment (e.g., equipment such as MEC equipment, SON equipment, RIC equipment, serving cell equipment, and other appropriate equipment). Also, at act 202, the UE can include, in the transmitted signal message data, UE information data, such as KPI values such as RSRP measurement values, RSSI measurement values, QoS metric values, SNR values, RSCP values, SIR values, SINR values, distance measurement values indicating distances between UE and serving cell equipment, distances measurement values indicating distances between UE and respective neighboring serving cell equipment, or other similarly appropriate data values. Also, at act 202, UE can send, via transmitted signal message data, data related to device type data indicative of whether the UE is terrestrial based or airborne. Device type data can, for example, be indicated using bit-flags or groupings of bits indicative that UE is an aerial UE of a land based UE. Additional data that can be conveyed, via transmitted signal message data, can included data related to subscription data such as UE international mobile subscriber identifier (IMSI) value data, UE subscriber identity module (SIM) value data, and/or other such appropriate data that can uniquely identify UE.

At act 204, the core network equipment (e.g., comparison engine 102), in response to receiving transmitted signal message data comprising, for example, UE information data, data related to device type data indicative of whether the UE is terrestrial based or airborne, and/or subscription data can determine the number of terrestrial UE that can have been impacted by UL interference caused by the introduction of aerial UE into the collection of terrestrial based UE being managed and/or monitored by serving cell equipment. At act 204, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. It will be noted that KPI values from each terrestrial based UE within the broadcast ambit of serving cell equipment can be used in the comparison. Thus, at act 204, the core network equipment can determine, on an individuated basis, the amount of interference that is being caused by aerial UE to each of the terrestrial based UE under the control and management of serving cell equipment.

At act 206, the core network equipment (e.g., comparison engine 102) can determine a radius that circumscribes terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment at act 206, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 208, the core network equipment (e.g., comparison engine 102) can identify aerial UE capabilities such as UL transmission power characteristics, battery power characteristics, antenna array configurations, or other pertinent capability characteristics. Additionally and/or alternatively, at act 208, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

Figure 10:
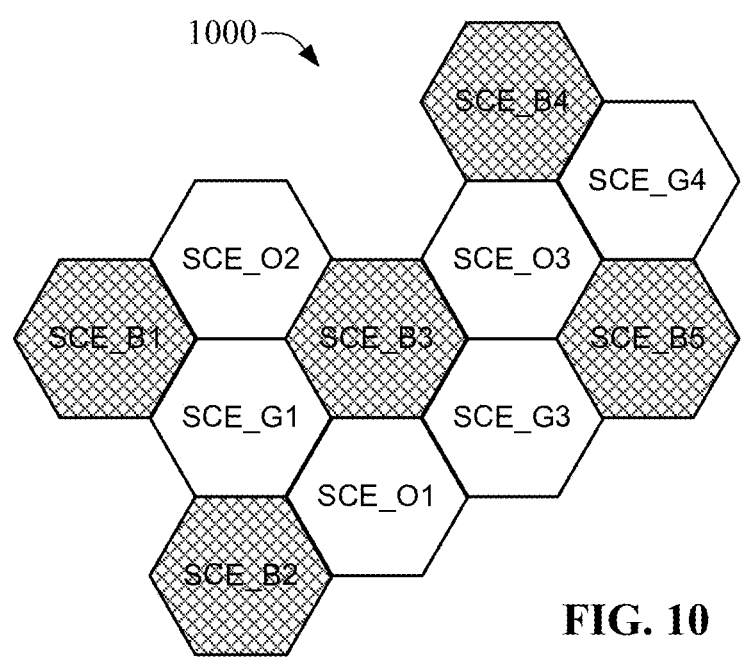
FIG. 10 depicts an illustrative situation with regard to intra frequency carrier aggregation, in accordance with aspects of the subject disclosure.

At act 210, the core network equipment (e.g., comparison engine 102) can direct aerial UE to engage into CA to split UL traffic among multiple service cell equipment in order to reduce UL interference to terrestrial based UE emanating for aerial UE. CA in some embodiments can based on intra frequency CA. With reference to FIG. 10, that depicts an illustrative situation with regard to intra frequency CA, terrestrial UE attached to serving cell equipment SCE_B1, serving cell equipment SCE_B2, serving cell equipment SCE_B3, . . . can be affected by aerial UE UL interference, because these serving cell equipment (and the UE {e.g., both terrestrial based UE and aerial UE}) can be operational using a first frequency band. Terrestrial UE attached to serving cell equipment SCE_B4 and serving cell equipment SCE_B5, can also be impacted, but to a lesser extent due to distance dynamics, by UL interference caused by aerial UE—because these serving cell equipment managing, for instance terrestrial based UE can also be operational in the first frequency band.

For purposes of this illustration (e.g., FIG. 10), aerial UE, in some embodiments, can interact with, and be in communication with serving cell equipment SCE_B1, serving cell equipment SCE_B2, and/or serving cell equipment SCE_B3 for purposes of intra frequency CA. Specifically, aerial UE can split its UL traffic among serving cell equipment SCE_B1, serving cell equipment SCE_B2, and/or serving cell equipment SCE_B3. In other embodiments, aerial UE can interact with and/or be in communication with a selective grouping of serving cell equipment SCE_B1, serving cell equipment SCE_B2, serving cell equipment SCE_B3, serving cell equipment SCE_B4, and/or serving cell equipment SCE_B5 to effectuate intra frequency CA.

In the foregoing context it should be noted that terrestrial based UE attached to serving cell equipment SCE_G1, serving cell equipment SCE_G2, serving cell equipment SCE_G3, serving cell equipment SCE_G4, serving cell equipment SCE_O1, serving cell equipment SCE_O2, and serving cell equipment SCE_O3, for example, will generally not be affected by UL interference induced by aerial UE that is attached specifically to serving cell equipment SCE_B1, serving cell equipment SCE_B2, serving cell equipment SCE_B3, and to a lesser extent serving cell equipment SCE_B4 and serving cell equipment SCE_B5, because serving cell equipment SCE_G1, serving cell equipment SCE_G2, serving cell equipment SCE_G3, and serving cell equipment SCE_G4, can be operating using a second frequency band distinct from the first frequency band, and serving cell equipment SCE_O1, serving cell equipment SCE_O2, and serving cell equipment SCE_O3 can be operational using a third frequency band that is distinguishable from both the first frequency band and the second frequency band.

In FIG. 10 the shading associated with serving cell equipment SCE_B1, serving cell equipment SCE_B2, serving cell equipment SCE_B3, serving cell equipment SCE_B4 and serving cell equipment SCE_B5 indicates that these severing cell equipment are using a same frequency band to communicate with terrestrial UE and/or aerial UE within the respective broadcast coverage areas afforded by each of serving cell equipment SCE_B1, serving cell equipment SCE_B2, serving cell equipment SCE_B3, serving cell equipment SCE_B4 and serving cell equipment SCE_B5.

Figure 11:
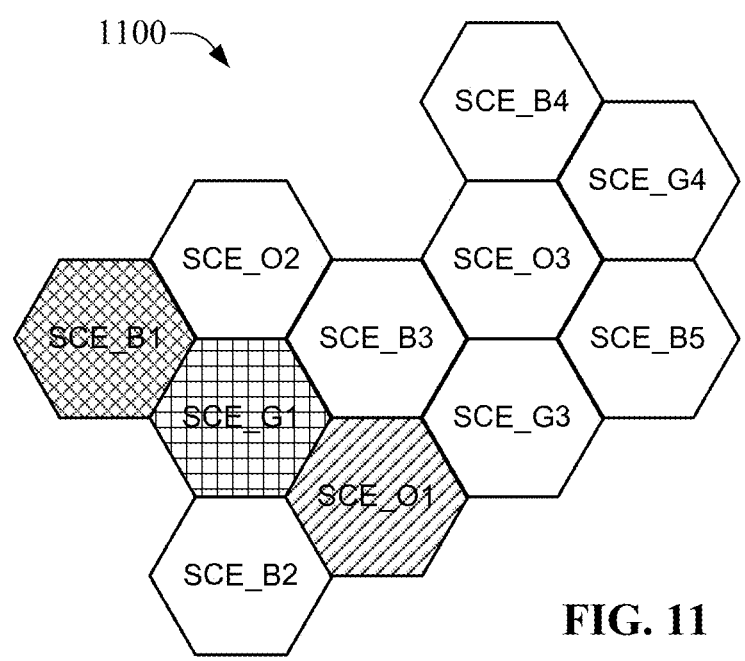
FIG. 11 provides illustration of an example situation with regard to inter frequency carrier aggregation, in accordance with aspects of the subject disclosure.

Returning back to FIG. 2, at act 210, the core network equipment, in some additional and/or alternative embodiments, can direct aerial UE to engage into CA to split UL traffic among multiple service cell equipment in order to reduce UL interference to terrestrial based UE emanating for aerial UE, but in these instances, CA can based on inter frequency CA. In accordance with inter frequency and with reference to FIG. 11 terrestrial based UE attached, for example, to serving cell equipment SCE_B1, serving cell equipment SCE_G1, and serving cell equipment SCE_O1 can be affected by aerial UE UL interference. Each of serving cell equipment SCE_B1, serving cell equipment SCE_G1, and serving cell equipment SCE_O1 can be operating using different frequency bands. For instance, serving cell equipment SCE_B1 can be using a first frequency band, serving cell equipment SCE_G1 can be using a second frequency band, and serving cell equipment SCE_O1 can be using a third frequency band, wherein the first frequency band is different from the second frequency band, and the third frequency band is distinguishable from both the first frequency band and the second frequency band. The diversity of frequency band being respectively used by each of serving cell equipment SCE_B1, serving cell equipment SCE_G1, and serving cell equipment SCE_O1 is depicted as disparate shading. It should be noted that, as illustrated in FIG. 11, serving cell equipment SCE_B2, serving cell equipment SCE_B3, serving cell equipment SCE_B4, and serving cell equipment SCE_B5 can also be operational in the first frequency band. Similarly, serving cell equipment SCE_G2, serving cell equipment SCE_G3, and serving cell equipment SCE_G4 can be using the second frequency band, and serving cell equipment SCE_O2 and serving cell equipment SCE_O3 can be using the third frequency band. It should also be further noted in the context of FIG. 11, that terrestrial UE affiliated with other proximate serving cell equipment (e.g., serving cell equipment SCE_B2, serving cell equipment SCE_B3, serving cell equipment SCE_G3, and/or serving cell equipment SCE_O2), to a lesser extent, can also experience the deleterious effects of aerial UE UL interference. Terrestrial based UE attached to other serving cell equipment typically will not be impacted by UL interference induced by aerial UE.

Also, at act 210, determinations can be made as to which CA to employ (e.g., intra frequency CA or inter frequency CA), which combination of CC to use, and which group of serving cell equipment should be used in order to reduce UL interference caused by aerial UE. Contemporaneously with determining which CA should be used, combinations of CC to employ, and groupings of serving cell equipment to use, at act 210, determinations are made with regard to how best to maintain aerial UE bandwidth requirements. CC and serving cell equipment can be nearby serving cell equipment as well as distant serving cell equipment. UL interference caused by aerial UE can vary depending on frequency bands used and serving cell equipment employed, and based at least in part on how UL traffic is split according to type of CA (e.g., intra frequency or inter frequency) selected, serving cell equipment used, and/or number of CC utilized. In regard to determining and/or selecting, for example, the most optimum combination of serving cell equipment, type of CA to be selected, and/or number of CC to be used, a cost benefit analysis can be used to make respective determination. For example, cost benefit analyses can be used to determine whether the cost of using a first group of serving cell equipment outweighs the benefits of using a second group of serving cell equipment. Similarly, cost benefit analyses can be carried out in regard to the number CC that should be used to beneficially reduce overall UL interference to terrestrial based UE caused by aerial UE. As will be noted by those of ordinary skill, other means of determining optimality with regard to selection of resources can be used with equality facility and/or functionality. Other determination means to render optimality in the selection of resources can include using Pareto optimality, using machine learning techniques and/or processes, using neural networks and artificial intelligence techniques, data mining and associated deep learning algorithms, etc.

Figure 3:
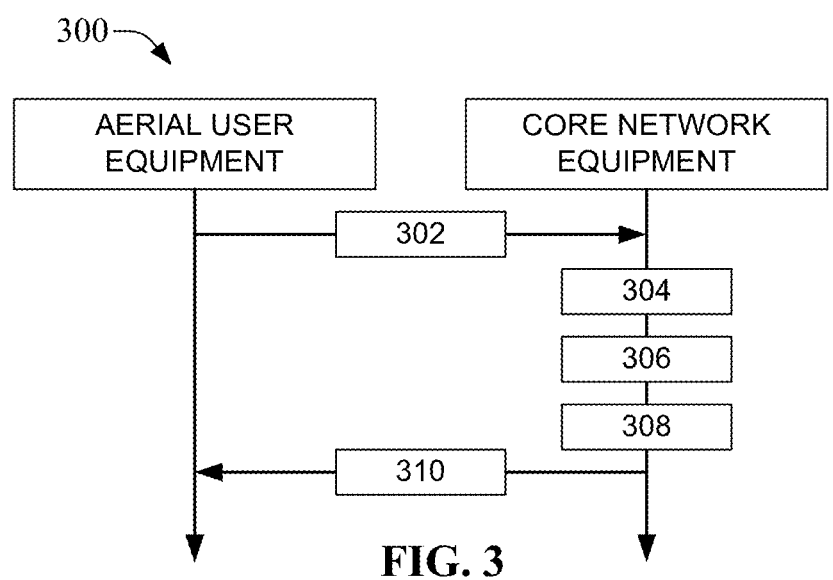
FIG. 3 provides illustration of a time sequence chart that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

With reference to FIG. 3 that illustrates an example time sequence chart 300 that can be used to effectuate and/or facilitate the reduction or elimination of uplink interference induced by aerial UE when aerial UE is introduced into groupings of terrestrial based UE operational in 4G LTE, 5G networks and/or other next generation networks. Time sequence chart can commence at act 302, wherein UE can contact, via transmitted signal message data, land based core network equipment (e.g., equipment such as MEC equipment, SON equipment, RIC equipment, serving cell equipment, and other appropriate equipment). Also, at act 302, the UE can include, in the transmitted signal message data, UE information data, such as KPI values such as RSRP measurement values, RSSI measurement values, QoS metric values, SNR values, RSCP values, SIR values, SINR values, distance measurement values indicating distances between UE and serving cell equipment, distances measurement values indicating distances between UE and respective neighboring serving cell equipment, or other similarly appropriate data values. Also, at act 302, UE can send, via transmitted signal message data, data related to device type data indicative of whether the UE is terrestrial based or airborne. Device type data can, for example, be indicated using bit-flags or groupings of bits indicative that UE is an aerial UE of a land based UE. Additional data that can be conveyed, via transmitted signal message data, can included data related to subscription data such as UE international mobile subscriber identifier (IMSI) value data, UE subscriber identity module (SIM) value data, and/or other such appropriate data that can uniquely identify UE.

At act 304, the core network equipment (e.g., comparison engine 102), in response to receiving transmitted signal message data comprising, for example, UE information data, data related to device type data indicative of whether the UE is terrestrial based or airborne, and/or subscription data can determine the number of terrestrial UE that can have been impacted by UL interference caused by the introduction of aerial UE into the collection of terrestrial based UE being managed and/or monitored by serving cell equipment. At act 304, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. It will be noted that KPI values from each terrestrial based UE within the broadcast ambit of serving cell equipment can be used in the comparison. Thus, at act 304, the core network equipment can determine, on an individuated basis, the amount of interference that is being caused by aerial UE to each of the terrestrial based UE under the control and management of serving cell equipment.

At act 306, the core network equipment (e.g., comparison engine 102) can determine a radius that circumscribes terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment at act 306, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 308, the core network equipment (e.g., comparison engine 102) can identify aerial UE capabilities such as UL transmission power characteristics, battery power characteristics, antenna array configurations, or other pertinent capability characteristics. Additionally and/or alternatively, at act 308, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

At act 310, the core network equipment (e.g., comparison engine 102) can direct aerial UE to handover to different serving cell equipment. In some embodiments, the core network equipment can direct aerial UE to handover to neighboring serving cell equipment that is providing service UE (e.g., terrestrial based UE and/or aerial UE) in the same frequency band (e.g., a first frequency band). In additional and/or alternative embodiments, the core network equipment can facilitate aerial UE to handover to neighboring serving cell equipment that is providing service to UE in one or more disparate frequency band (e.g., a second frequency band and/or third frequency band). As will be appreciated in the foregoing instance, the first frequency band, the second frequency band, and/or the third frequency band can be distinguishable from one another. Once again as has been noted earlier, the core network equipment can use cost benefit analyses, Pareto optimization analysis, artificial intelligence techniques, Bayesian belief networks (e.g., using probabilistic graphical models that represent groups of variables and their conditional dependencies via directed acyclic graphs (DAGs)), neural networks comprising nodes (e.g., an input group of nodes, one or more intermediary (hidden) collection of nodes, and an output grouping of nodes) and groups of weightings between the nodes.

At act 310, the core network equipment can reduce the overall UL interference introduced to terrestrial based UE by aerial UE by ensuring that the aerial UE hands over to serving cell equipment that has, for example, few attached terrestrial based UE and/or a low UL load. The serving cell equipment in the foregoing embodiments can be immediately proximate and/or neighboring serving cell equipment (e.g., serving cell equipment geographically abutting, adjoining, contiguous with the service range of serving cell equipment currently servicing aerial UE), and/or can be serving cell equipment that is located at a significant distance from serving cell equipment that is currently servicing the aerial UE.

Figure 4:
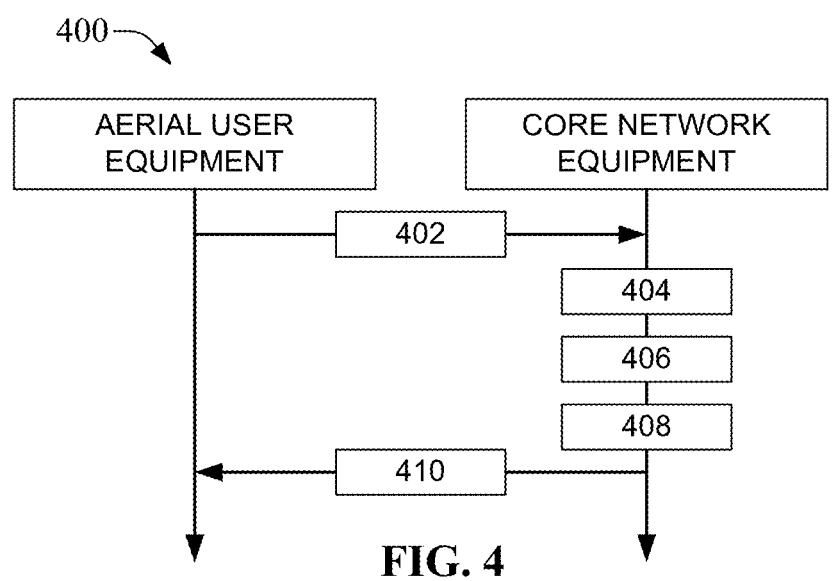
FIG. 4 provides illustration of a time sequence chart that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

FIG. 4 depicts another example time sequence chart 400 that can be used to effectuate and/or facilitate the reduction or elimination of uplink interference induced by aerial UE when aerial UE is introduced into groupings of terrestrial based UE operational in 4G LTE, 5G networks and/or other next generation networks. Time sequence chart can commence at act 402, wherein UE can contact, via transmitted signal message data, land based core network equipment (e.g., equipment such as MEC equipment, SON equipment, RIC equipment, serving cell equipment, and other appropriate equipment). Also, at act 402, the UE can include, in the transmitted signal message data, UE information data, such as KPI values such as RSRP measurement values, RSSI measurement values, QoS metric values, SNR values, RSCP values, SIR values, SINR values, distance measurement values indicating distances between UE and serving cell equipment, distances measurement values indicating distances between UE and respective neighboring serving cell equipment, or other similarly appropriate data values. Also, at act 402, UE can send, via transmitted signal message data, data related to device type data indicative of whether the UE is terrestrial based or airborne. Device type data can, for example, be indicated using bit-flags or groupings of bits indicative that UE is an aerial UE of a land based UE. Additional data that can be conveyed, via transmitted signal message data, can included data related to subscription data such as UE international mobile subscriber identifier (IMSI) value data, UE subscriber identity module (SIM) value data, and/or other such appropriate data that can uniquely identify UE.

At act 404, the core network equipment (e.g., comparison engine 102), in response to receiving transmitted signal message data comprising, for example, UE information data, data related to device type data indicative of whether the UE is terrestrial based or airborne, and/or subscription data can determine the number of terrestrial UE that can have been impacted by UL interference caused by the introduction of aerial UE into the collection of terrestrial based UE being managed and/or monitored by serving cell equipment. At act 404, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. It will be noted that KPI values from each terrestrial based UE within the broadcast ambit of serving cell equipment can be used in the comparison. Thus, at act 404, the core network equipment can determine, on an individuated basis, the amount of interference that is being caused by aerial UE to each of the terrestrial based UE under the control and management of serving cell equipment.

At act 406, the core network equipment (e.g., comparison engine 102) can determine a radius that circumscribes terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment, at act 406, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 408, the core network equipment (e.g., comparison engine 102) can identify aerial UE capabilities such as UL transmission power characteristics, battery power characteristics, antenna array configurations, or other pertinent capability characteristics. Additionally and/or alternatively, at act 408, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

At act 410, the core network equipment (e.g., comparison engine 102) can direct aerial UE to engage in one or more UL beam forming processes with serving cell equipment currently providing service to aerial UE. By ensuring aerial UE effectuate appropriate UL beam forming (e.g., better focusing the transmit power of aerial UE UL signal to antennae associated with the serving cell equipment), UL interference to terrestrial based UE, also being serviced by current serving cell equipment, by aerial UE can be significantly eliminated or reduced.

Figure 5:
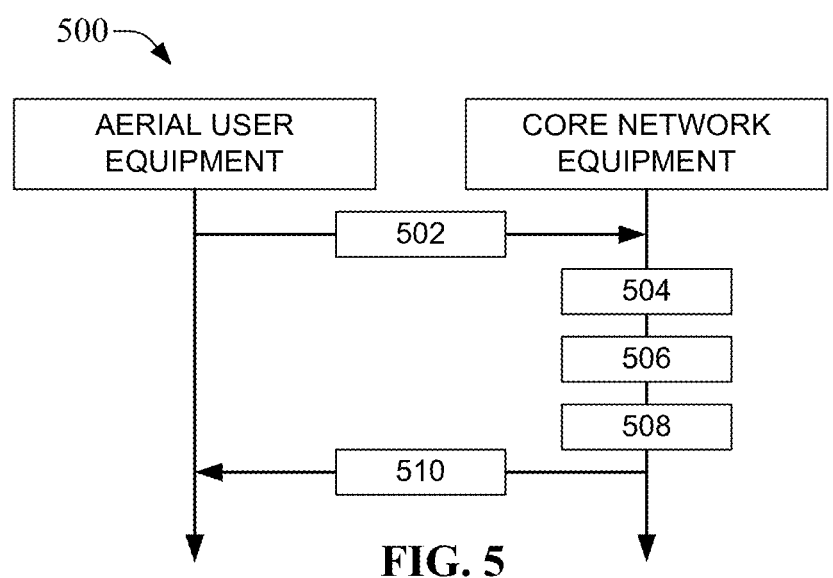
FIG. 5 provides illustration of a time sequence chart that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

FIG. 5 depicts another example time sequence chart 500 that can be used to effectuate and/or facilitate the reduction or elimination of uplink interference induced by aerial UE when aerial UE is introduced into groupings of terrestrial based UE operational in 4G LTE, 5G networks and/or other next generation networks. Time sequence chart can commence at act 502, wherein UE can contact, via transmitted signal message data, land based core network equipment (e.g., equipment such as MEC equipment, SON equipment, RIC equipment, serving cell equipment, and other appropriate equipment). Also, at act 502, the UE can include, in the transmitted signal message data, UE information data, such as KPI values such as RSRP measurement values, RSSI measurement values, QoS metric values, SNR values, RSCP values, SIR values, SINR values, distance measurement values indicating distances between UE and serving cell equipment, distances measurement values indicating distances between UE and respective neighboring serving cell equipment, or other similarly appropriate data values. Also, at act 502, the UE can send, via transmitted signal message data, data related to device type data indicative of whether the UE is terrestrial based or airborne. Device type data can, for example, be indicated using bit-flags or groupings of bits indicative that UE is an aerial UE of a land based UE. Additional data that can be conveyed, via transmitted signal message data, can included data related to subscription data such as UE international mobile subscriber identifier (IMSI) value data, UE subscriber identity module (SIM) value data, and/or other such appropriate data that can uniquely identify UE.

At act 504, the core network equipment (e.g., comparison engine 102), in response to receiving transmitted signal message data comprising, for example, UE information data, data related to device type data indicative of whether the UE is terrestrial based or airborne, and/or subscription data can determine the number of terrestrial UE that can have been impacted by UL interference caused by the introduction of aerial UE into the collection of terrestrial based UE being managed and/or monitored by serving cell equipment. At act 504, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. It will be noted that KPI values from each terrestrial based UE within the broadcast ambit of serving cell equipment can be used in the comparison. Thus, at act 504, the core network equipment can determine, on an individuated basis, the amount of interference that is being caused by aerial UE to each of the terrestrial based UE under the control and management of serving cell equipment.

At act 506, the core network equipment (e.g., comparison engine 102) can determine a radius that circumscribes terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment at act 506, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 508, the core network equipment (e.g., comparison engine 102) can identify aerial UE capabilities such as UL transmission power characteristics, battery power characteristics, antenna array configurations, or other pertinent capability characteristics. Additionally and/or alternatively, at act 508, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

At act 510, the core network equipment (e.g., comparison engine 102) can decide that a handover needs to be effectuated, wherein groups of terrestrial based UE that are being impacted by UL interference emanating of aerial UE can be handed over to other serving cell equipment and/or the groups of terrestrial based UE can be serviced by serving cell equipment using different frequency bands.

Figure 6:
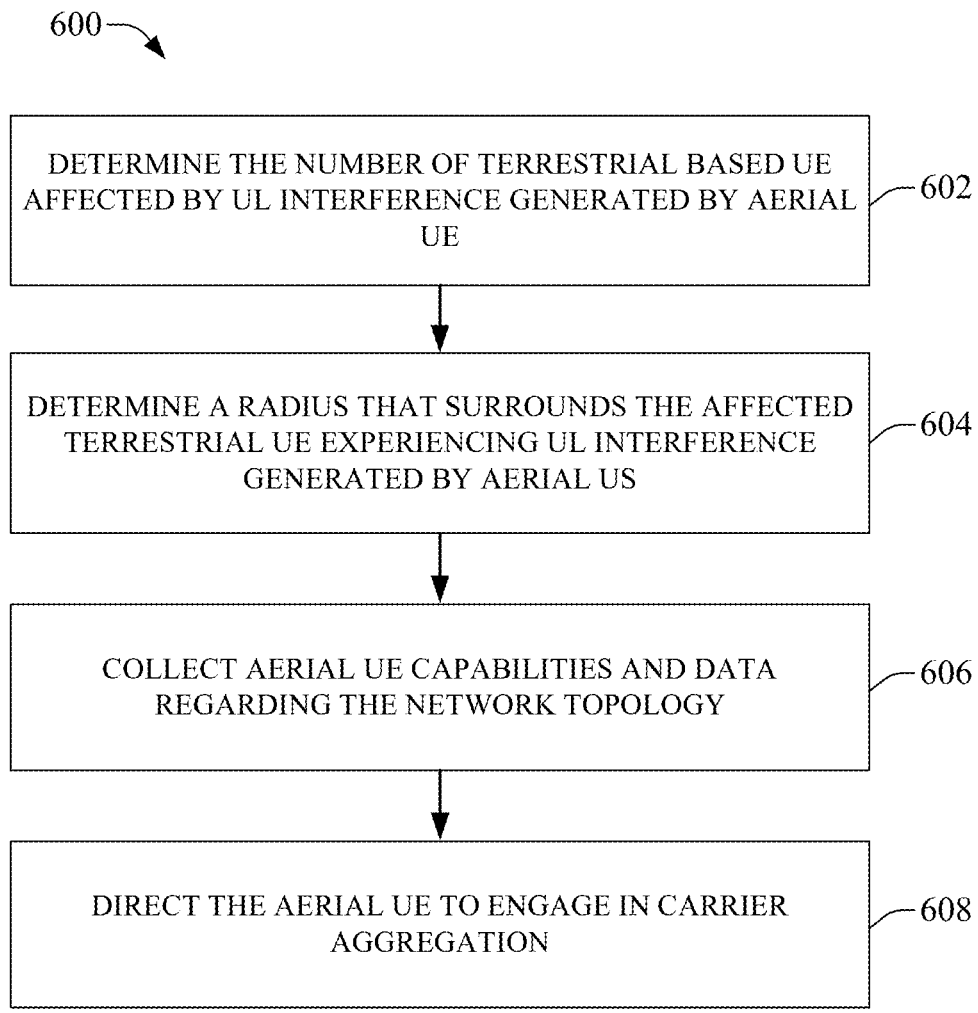
FIG. 6 provides a flow chart or method that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

FIG. 6 illustrates a method 600 that can be used to effectuate and/or facilitate the reduction or elimination of uplink interference induced by aerial UE when aerial UE is introduced into collections of terrestrial UE operational in 4G LTE, 5G networks and/or other generation networks. Method 600 can commence at act 602, wherein core network equipment (e.g., comparison engine 102), in response to receiving transmitted signal message data can determine the number of terrestrial UE that can have been impacted by UL interference caused by the introduction of aerial UE into the collection of terrestrial based UE being managed and/or monitored by serving cell equipment. At act 602, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. As noted earlier, KPI values from each terrestrial based UE within the broadcast ambit of serving cell equipment can be used in the comparison. Thus, at act 602, the core network equipment can determine, on an individuated basis, the amount of interference that is being caused by aerial UE to each of the terrestrial based UE under the control and management of serving cell equipment.

At act 604, a determination can be made with respect to a radius that can circumscribe terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment at act 604, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 606, the core network equipment (e.g., comparison engine 102) can identify aerial UE capabilities such as UL transmission power characteristics, battery power characteristics, antenna array configurations, or other pertinent capability characteristics. Additionally and/or alternatively, at act 606, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

At act 608, the core network equipment (e.g., comparison engine 102) can direct aerial UE to engage into CA to split UL traffic among multiple service cell equipment in order to reduce UL interference to terrestrial based UE emanating from aerial UE. As noted earlier, CA in some embodiments can based on intra frequency CA, while in other additional and/or alternative embodiments can be effectuated based on inter frequency CA. At act 608, determinations can be made as to which type of CA to employ (e.g., intra frequency CA or inter frequency CA), which combination of CC to use, and which group of serving cell equipment should be used in order to reduce UL interference caused by aerial UE. Contemporaneously with determining which type of CA should be used, combinations of CC to employ, and groupings of serving cell equipment to use, at act 608, determinations are made with regard to how best to maintain aerial UE bandwidth requirements. CC and serving cell equipment can be nearby serving cell equipment as well as distant serving cell equipment. UL interference caused by aerial UE can vary depending on frequency bands used and serving cell equipment employed, and based at least in part on how UL traffic is split according to type of CA (e.g., intra frequency or inter frequency) selected, serving cell equipment used, and/or number of CC utilized. In regard to determining and/or selecting, for example, the most optimum combination of serving cell equipment, type of CA to be selected, and/or number of CC to be used, a cost benefit analysis can be used to make respective determinations. For example, cost benefit analyses can be used to determine whether the cost of using a first group of serving cell equipment outweighs the benefits of using a second group of serving cell equipment. Similarly, cost benefit analyses can be carried out in regard to the number CC that should be used to beneficially reduce overall UL interference to terrestrial based UE caused by aerial UE. As will be noted by those of ordinary skill, other means of determining optimality with regard to selection of resources can be used with equality facility and/or functionality. Other determination means to render optimality in the selection of resources can include using Pareto optimality, using machine learning techniques and/or processes, using neural networks and artificial intelligence techniques, data mining and associated deep learning algorithms, etc.

Figure 7:
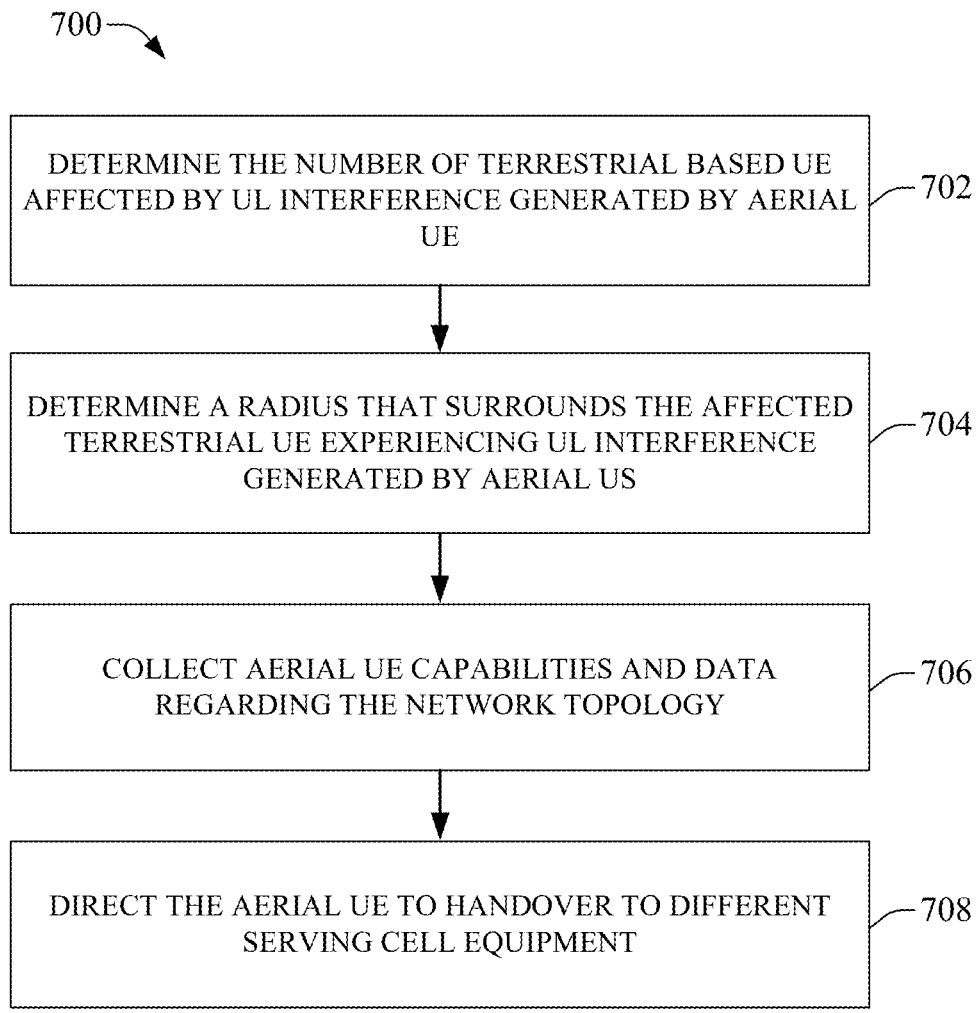
FIG. 7 provides a flow chart or method that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

FIG. 7 depicts a method 700 that can be used to effectuate and/or facilitate the reduction or elimination of uplink interference induced by aerial UE when aerial UE is introduced into collections of terrestrial UE operational in 4G LTE, 5G networks and/or other generation networks. Method 700 can commence at act 702, wherein core network equipment, in response to receiving transmitted signal message data can determine the number of terrestrial UE that can have been impacted by UL interference caused by the introduction of aerial UE into the collection of terrestrial based UE being managed and/or monitored by serving cell equipment. At act 702, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. As noted earlier, KPI values from each terrestrial based UE within the broadcast ambit of serving cell equipment can be used in the comparison. Thus, at act 702, the core network equipment can determine, on an individuated basis, the amount of interference that is being caused by aerial UE to each of the terrestrial based UE under the control and management of serving cell equipment.

At act 704, a determination can be made with respect to a radius that can circumscribe terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment at act 704, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 706, the core network equipment can identify aerial UE capabilities such as UL transmission power characteristics, battery power characteristics, antenna array configurations, or other pertinent capability characteristics. Additionally and/or alternatively, at act 706, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

At act 708, the core network equipment can direct aerial UE to handover to different serving cell equipment. In some embodiments, the core network equipment can direct aerial UE to handover to neighboring serving cell equipment that is providing service UE (e.g., terrestrial based UE and/or aerial UE) in the same frequency band (e.g., a first frequency band). In additional and/or alternative embodiments, the core network equipment can facilitate aerial UE to handover to neighboring serving cell equipment that is providing service to UE in one or more disparate frequency band (e.g., a second frequency band and/or third frequency band). As will be appreciated in the foregoing instance, the first frequency band, the second frequency band, and/or the third frequency band can be distinguishable from one another. Once again as has been noted earlier, the core network equipment can use cost benefit analyses, Pareto optimization analysis, artificial intelligence techniques, Bayesian belief networks (e.g., using probabilistic graphical models that represent groups of variables and their conditional dependencies via directed acyclic graphs (DAGs)), neural networks comprising nodes (e.g., an input group of nodes, one or more intermediary (hidden) collection of nodes, and an output grouping of nodes) and groups of weightings between the nodes.

Also, at act 708, the core network equipment can reduce the overall UL interference introduced to terrestrial based UE by aerial UE by ensuring that the aerial UE hands over to serving cell equipment that has, for example, few attached terrestrial based UE and/or a low UL load. The serving cell equipment in the foregoing embodiments can be immediately proximate and/or neighboring serving cell equipment (e.g., serving cell equipment geographically abutting, adjoining, contiguous with the service range of serving cell equipment currently servicing aerial UE), and/or can be serving cell equipment that is located at a significant distance from serving cell equipment that is currently servicing the aerial UE.

Figure 8:
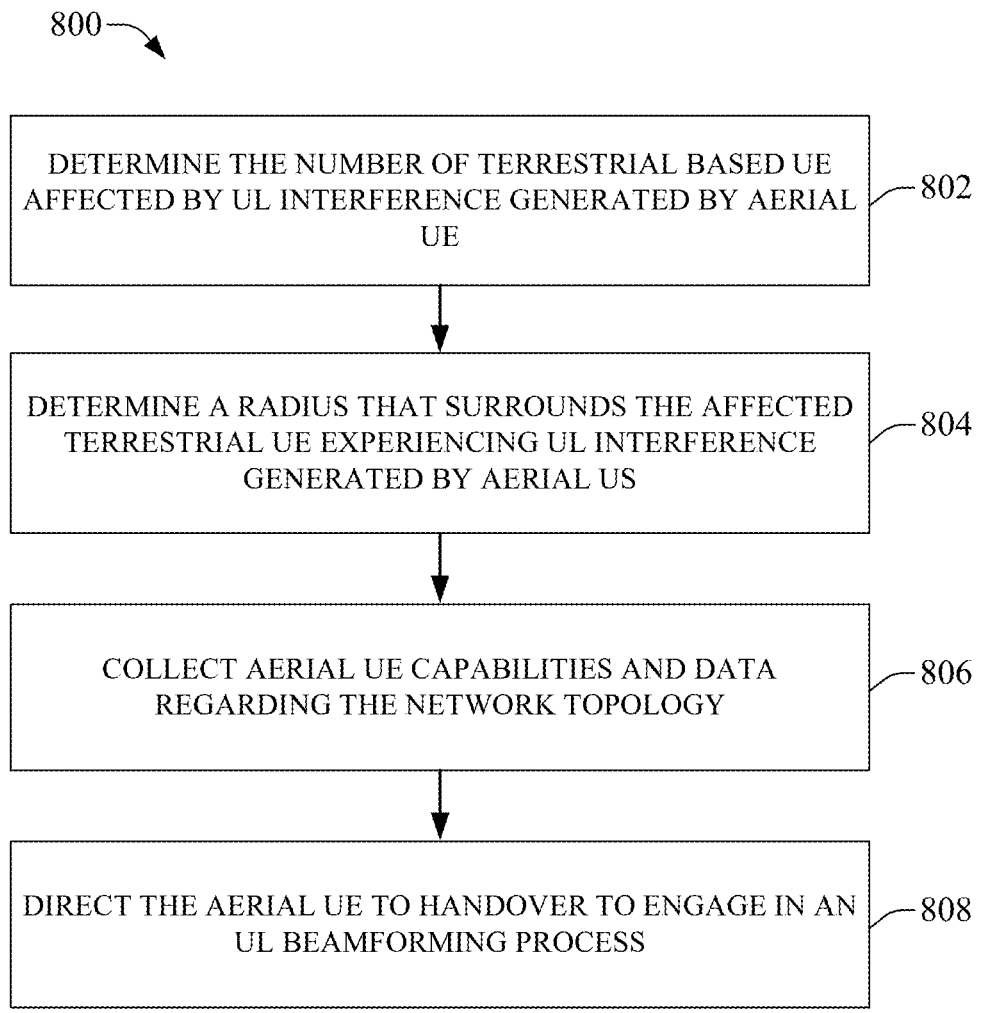
FIG. 8 provides a flow chart or method that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

FIG. 8 illustrates another method 800 that can be used to effectuate and/or facilitate the reduction or elimination of uplink interference induced by aerial UE when aerial UE is introduced into collections of terrestrial UE operational in 4G LTE, 5G networks and/or other generation networks. Method 800 can commence at act 802, wherein core network equipment, in response to receiving transmitted signal message data can determine the number of terrestrial UE that can have been impacted by UL interference caused by the introduction of aerial UE into the collection of terrestrial based UE being managed and/or monitored by serving cell equipment. At act 802, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. As noted earlier, KPI values from each terrestrial based UE within the broadcast ambit of serving cell equipment can be used in the comparison. Thus, at act 802, the core network equipment can determine, on an individuated basis, the amount of interference that is being caused by aerial UE to each of the terrestrial based UE under the control and management of serving cell equipment.

At act 804, a determination can be made with respect to a radius that can circumscribe terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment at act 804, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 806, the core network equipment can identify aerial UE capabilities such as UL transmission power characteristics, battery power characteristics, antenna array configurations, or other pertinent capability characteristics. Additionally and/or alternatively, at act 806, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

At act 808, the core network equipment can direct aerial UE to engage in one or more UL beam forming processes with serving cell equipment currently providing service to aerial UE. By ensuring aerial UE effectuate appropriate UL beam forming (e.g., better focusing the transmit power of aerial UE UL signal to antennae associated with the serving cell equipment), UL interference to terrestrial based UE, also being serviced by current serving cell equipment, by aerial UE can be significantly eliminated or reduced.

Figure 9:
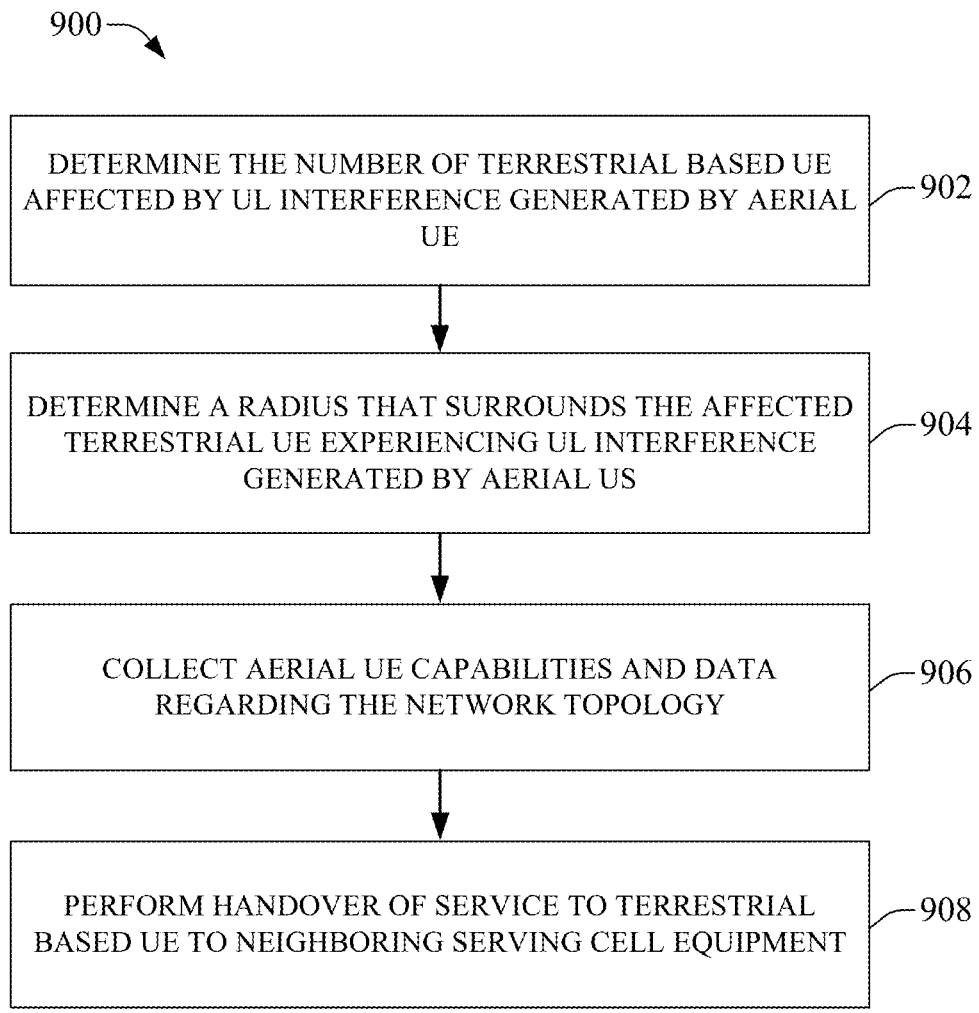
FIG. 9 provides a flow chart or method that facilitates the reduction or elimination of uplink interference induced by aerial UE when aerial UE is introduced into groups of terrestrial based UE operational in 4G LTE, 5G networks and/or other next generation networks, in accordance with aspects of the subject disclosure.

FIG. 9 illustrates a further method 900 that can be used to effectuate and/or facilitate the reduction or elimination of uplink interference induced by aerial UE when aerial UE is introduced into collections of terrestrial UE operational in 4G LTE, 5G networks and/or other generation networks. Method 900 can commence at act 902, wherein core network equipment, in response to receiving transmitted signal message data can determine the number of terrestrial UE that can have been impacted by UL interference caused by the introduction of aerial UE into the collection of terrestrial based UE being managed and/or monitored by serving cell equipment. At act 902, the core network equipment, based on the KPI values can compare UL interference that terrestrial UE attached to serving cell equipment can have been experiencing prior to the arrival (attachment) of aerial UE into the broadcast ambit controlled and/or monitored by serving cell equipment and after arrival of aerial UE into the broadcast ambit controlled and/or monitored by serving cell equipment. As noted earlier, KPI values from each terrestrial based UE within the broadcast ambit of serving cell equipment can be used in the comparison. Thus, at act 902, the core network equipment can determine, on an individuated basis, the amount of interference that is being caused by aerial UE to each of the terrestrial based UE under the control and management of serving cell equipment.

At act 904, a determination can be made with respect to a radius that can circumscribe terrestrial based UE that are being affected by UL interference caused by the arrival or presence of aerial UE within the transmission umbra and/or penumbra cast by serving cell equipment. The radius surrounding affected terrestrial based UE can include the transmission umbrae and/or penumbrae of multiple neighboring serving cell equipment. Thus, as will be appreciated by those of ordinary skill, the radius determined and generated by the core network equipment at act 904, to circumscribe affected terrestrial based UE, can include, not only serving cell equipment that is currently serving terrestrial based UE and the attaching or attached aerial UE, but can also include terrestrial based UE associated with neighboring serving cell equipment, both contiguous with current serving cell equipment and at great remote distance from current serving cell equipment.

At act 906, the core network equipment can identify aerial UE capabilities such as UL transmission power characteristics, battery power characteristics, antenna array configurations, or other pertinent capability characteristics. Additionally and/or alternatively, at act 906, the core network equipment can obtain or receive from groups of maintained databases data representative of geographical and/or topographical data associated with, and within the vicinity of, serving cell equipment. Geographical and/or topographical data can comprise geographical coordinate data that identifies serving cell equipment with respect to neighboring serving cell equipment (e.g., proximate (e.g., adjacent, abutting, contiguous, . . . ), remote (e.g., not immediately proximate), and/or distantly remote (e.g., both not proximate and at very great distances from serving cell equipment at issue)).

At act 908, the core network equipment can decide that a handover needs to be effectuated, wherein groups of terrestrial based UE that are being impacted by UL interference emanating of aerial UE can be handed over to other serving cell equipment and/or the groups of terrestrial based UE can be serviced by serving cell equipment using different frequency bands.

Figure 14:
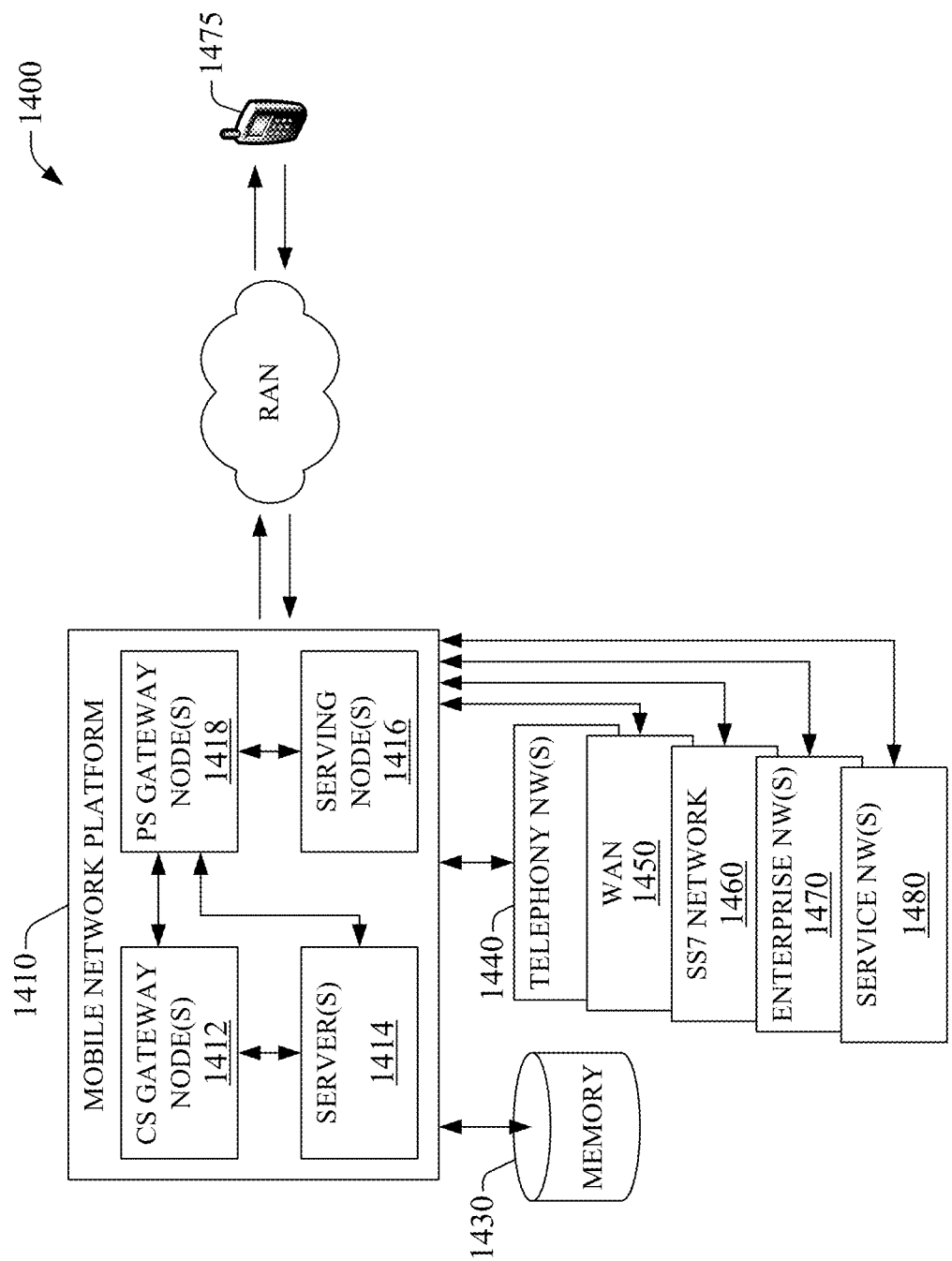
FIG. 14 is a block diagram of an example embodiment of a mobile network platform to implement and exploit various features or aspects of the subject disclosure.

FIG. 14 presents an example embodiment 1400 of a mobile network platform 1410 that can implement and exploit one or more aspects of the disclosed subject matter described herein. Generally, wireless network platform 1410 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1410 can be included in telecommunications carrier networks, and can be considered carrier-side components as discussed elsewhere herein. Mobile network platform 1410 includes CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1470. Circuit switched gateway node(s) 1412 can authorize and authenticate traffic (e.g., voice) arising from such networks. Additionally, CS gateway node(s) 1412 can access mobility, or roaming, data generated through SS7 network 1460; for instance, mobility data stored in a visited location register (VLR), which can reside in memory 1430. Moreover, CS gateway node(s) 1412 interfaces CS-based traffic and signaling and PS gateway node(s) 1418. As an example, in a 3GPP UMTS network, CS gateway node(s) 1412 can be realized at least in part in gateway GPRS support node(s) (GGSN). It should be appreciated that functionality and specific operation of CS gateway node(s) 1412, PS gateway node(s) 1418, and serving node(s) 1416, is provided and dictated by radio technology(ies) utilized by mobile network platform 1410 for telecommunication.

In addition to receiving and processing CS-switched traffic and signaling, PS gateway node(s) 1418 can authorize and authenticate PS-based data sessions with served mobile devices. Data sessions can include traffic, or content(s), exchanged with networks external to the wireless network platform 1410, like wide area network(s) (WANs) 1450, enterprise network(s) 1470, and service network(s) 1480, which can be embodied in local area network(s) (LANs), can also be interfaced with mobile network platform 1410 through PS gateway node(s) 1418. It is to be noted that WANs 1450 and enterprise network(s) 1470 can embody, at least in part, a service network(s) like IP multimedia subsystem (IMS). Based on radio technology layer(s) available in technology resource(s) 1417, packet-switched gateway node(s) 1418 can generate packet data protocol contexts when a data session is established; other data structures that facilitate routing of packetized data also can be generated. To that end, in an aspect, PS gateway node(s) 1418 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, wireless network platform 1410 also includes serving node(s) 1416 that, based upon available radio technology layer(s) within technology resource(s) 1417, convey the various packetized flows of data streams received through PS gateway node(s) 1418. It is to be noted that for technology resource(s) 1417 that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN).

For radio technologies that exploit packetized communication, server(s) 1414 in wireless network platform 1410 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS) network(s) (not shown). Provisioning server(s) can also provision coverage through networks associated to wireless network platform 1410 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1475.

It is to be noted that server(s) 1414 can include one or more processors configured to confer at least in part the functionality of macro network platform 1410. To that end, the one or more processor can execute code instructions stored in memory 1430, for example. It is should be appreciated that server(s) 1414 can include a content manager 1415, which operates in substantially the same manner as described hereinbefore.

In example embodiment 1400, memory 1430 can store information related to operation of wireless network platform 1410. Other operational information can include provisioning information of mobile devices served through wireless platform network 1410, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1430 can also store information from at least one of telephony network(s) 1440, WAN 1450, enterprise network(s) 1470, or SS7 network 1460. In an aspect, memory 1430 can be, for example, accessed as part of a data store component or as a remotely connected memory store.

Figure 15:
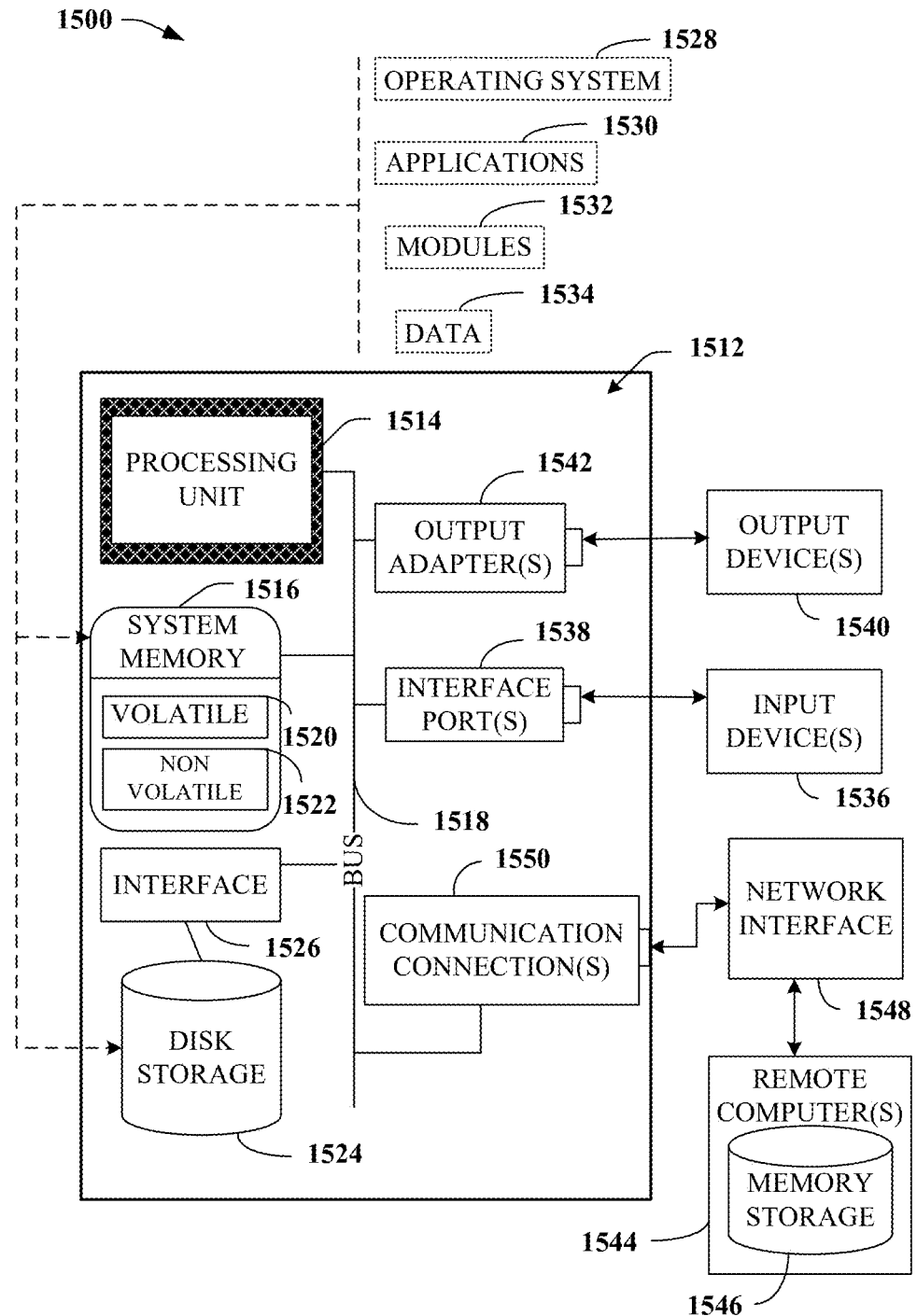
FIG. 15 illustrates a block diagram of a computing system operable to execute the disclosed systems and methods in accordance with an embodiment.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1520 (see below), non-volatile memory 1522 (see below), disk storage 1524 (see below), and memory storage 1546 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute the disclosed systems and methods in accordance with an embodiment. Computer 1512, which can be, for example, part of the hardware of system 150, includes a processing unit 1514, a system memory 1516, and a system bus 1518. System bus 1518 couples system components including, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1516 can include volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can include ROM, PROM, EPROM, EEPROM, or flash memory. Volatile memory 1520 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 can also include removable/non-removable, volatile/non-volatile computer storage media. FIG. 15 illustrates, for example, disk storage 1524. Disk storage 1524 includes, but is not limited to, devices like a magnetic disk drive, floppy disk drive, tape drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software includes an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. As an example, mobile device and/or portable device can include a user interface embodied in a touch sensitive display panel allowing a user to interact with computer 1512. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 include, for example, a serial port, a parallel port, a game port, a universal serial bus (USB), an infrared port, a Bluetooth port, an IP port, or a logical port associated with a wireless service, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 include, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, cloud service, a workstation, a microprocessor based appliance, a peer device, or other common network node and the like, and typically includes many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically connected by way of communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network equipment, comprising:
   a processor; and
   a memory that stores instructions that, when executed by the processor, facilitates performance of operations, comprising:
   determining a number of terrestrial based user equipment impacted by uplink interference caused by an entry of aerial user equipment into a collection of terrestrial based user equipment controlled by serving cell equipment;
   determining a boundary area that encompasses the number of terrestrial based user equipment; and
   initiating carrier aggregation on the aerial user equipment, wherein the carrier aggregation splits uplink traffic transmitted by the aerial user equipment over a group of serving cell equipment included in the boundary area.

2. The network equipment of claim 1, wherein determining the number of terrestrial based user equipment is based on uplink interference data received prior to the entry of the aerial user equipment into the collection of terrestrial based user equipment.

3. The network equipment of claim 1, wherein determining the number of terrestrial based user equipment is based on uplink interference data received after to the entry of the aerial user equipment into the collection of terrestrial based user equipment.

4. The network equipment of claim 1, wherein the operations further comprise receiving capability data representing the aerial user equipment.

5. The network equipment of claim 4, wherein the capability data represents an uplink power characteristic.

6. The network equipment of claim 4, wherein the capability data represents a battery power characteristic.

7. The network equipment of claim 4, wherein the capability data represents an antenna array configuration.

8. The network equipment of claim 1, wherein the operations further comprise determining a number of groupings of component carriers associated with the carrier aggregation to be assigned to serving cell equipment included in the group of serving cell equipment included in the boundary area.

9. The network equipment of claim 8, wherein determining the number of grouping of component carriers comprises determining the number that reduces the uplink interference caused by the entry of aerial user equipment into the collection of terrestrial based user equipment.

10. A method, comprising:
    determining, by equipment comprising a processor, a number of terrestrial based user equipment impacted by uplink interference caused by uplink transmissions associated with aerial user equipment, wherein the aerial user equipment and the terrestrial based user equipment are controlled by serving cell equipment;
    determining, by the equipment, an enclosed area that bounds the number of terrestrial based user equipment; and
    initiating, by the equipment, a carrier aggregation process on the aerial user equipment, wherein the carrier aggregation divides the uplink transmissions associated with the aerial user equipment over a group of serving cell equipment included in the enclosed area.

11. The method of claim 10, wherein determining the number of terrestrial based user equipment comprises determining the number of terrestrial based user equipment based on uplink interference data received prior to attachment of the aerial user equipment to the serving cell equipment.

12. The method of claim 10, wherein determining the number of terrestrial based user equipment comprises determining the number of terrestrial based user equipment based on uplink interference data received after to attachment of the aerial user equipment to the serving cell equipment.

13. The method of claim 10, further comprising receiving, by the equipment, capability data representing the aerial user equipment.

14. The method of claim 13, wherein the capability data represents an uplink power characteristic.

15. The method of claim 13, wherein the capability data represents a battery power characteristic.

16. The method of claim 10, further comprising determining, by the equipment, the uplink interference as a function of a key performance indicator value.

17. The method of claim 16, wherein the key performance indicator value represents a received signal strength over noise power ratio value that the terrestrial based user equipment uses to effectuate an uplink transmission.

18. A non-transitory machine-readable medium, comprising executable instructions that, when executed by a processor, facilitate performance of operations, comprising:
    determining a number of terrestrial based user equipment impacted by uplink interference caused by uplink transmissions associated with aerial user equipment, wherein the aerial user equipment and the terrestrial based user equipment are controlled by serving cell equipment;

determining an enclosed area that bounds the number of terrestrial based user equipment; and initiating a carrier aggregation process on the aerial user equipment, wherein the carrier aggregation divides the uplink transmissions associated with the aerial user equipment over a group of serving cell equipment included in the enclosed area.

19. The non-transitory machine-readable medium of claim 18, wherein the operations further comprise determining the uplink interference as a function of a key performance indicator value exceeding a threshold value.

20. The non-transitory machine-readable medium of claim 19, wherein the key performance indicator value represents a received signal strength over noise power ratio value that the terrestrial based user equipment is to use for an uplink transmission.

* * * * *